United States Patent
Kupka et al.

[11] Patent Number: 5,196,772
[45] Date of Patent: Mar. 23, 1993

[54] APPARATUS FOR FITTING TIRES ON WHEELS

[75] Inventors: Heinz Kupka, Sulzbach; Heinz Ronge, Mühltal, both of Fed. Rep. of Germany

[73] Assignee: Hofmann Maschinenbau GmbH, Pfungstadt, Fed. Rep. of Germany

[21] Appl. No.: 750,317

[22] Filed: Aug. 27, 1991

[30] Foreign Application Priority Data

Sep. 5, 1990 [DE] Fed. Rep. of Germany ....... 4028080

[51] Int. Cl.$^5$ ............................................. B60C 25/05
[52] U.S. Cl. ...................... 318/434; 318/362; 318/433; 157/1.1
[58] Field of Search ............... 318/430, 431, 432, 433, 318/434, 362, 373, 374, 375, 379; 157/1.17, 1.20, 1.21, 1.22, 1.24, 1.26, 1.1; 361/23, 31

[56] References Cited

U.S. PATENT DOCUMENTS

| | | | |
|---|---|---|---|
| 4,002,960 | 1/1977 | Brookfield et al. | 318/257 |
| 4,210,852 | 7/1980 | Gustavson | 318/459 |
| 4,661,752 | 4/1987 | Nishikawa et al. | 318/434 |
| 4,677,356 | 6/1987 | Tsuneda et al. | 318/258 |
| 4,947,919 | 8/1990 | Timlin | 157/1.24 |
| 4,986,328 | 1/1991 | Metzger | 157/1.24 |
| 4,999,552 | 3/1991 | Seipelt | 318/434 |
| 5,059,879 | 10/1991 | Watanabe | 318/603 |

*Primary Examiner*—Bentsu Ro
*Attorney, Agent, or Firm*—Cushman, Darby & Cushman

[57] ABSTRACT

Apparatus for fitting a motor vehicle tire on a disc wheel comprises a tire fitting tool mounted rotatably about an axis, an electric drive motor to drive the tire fitting tool about the axis, a current supply means for the drive motor, and a torque limiting means to terminate the rotary drive to the motor when a predetermined torque transmitted to the tire fitting tool is exceeded, thereby to protect the tire from overloading in the fitting operation.

9 Claims, 2 Drawing Sheets

APPARATUS FOR FITTING TIRES ON WHEELS

BACKGROUND OF THE INVENTION

To provide for quicker and more rational fitting of motor vehicle tires on to the rims of disc wheels, various forms of tire fitting apparatuses have been developed, comprising a tire fitting tool which is mounted rotatably about and at a spacing from an axis, with an electric motor to act as a drive motor for producing a rotary drive movement of the tire fitting tool about the axis, and a power supply for the electric motor. In an example of such an apparatus, as described in the document 'Hofmann report 66' which describes a piece of equipment referred to as 'Automatic tire fitting and inflation installation RMS-MT', the fitting tool assembly for example is mounted in the form of two tire fitting rollers and a tire guide roller on a single-arm fitting head. The radial and axial spacing of the fitting head can be adjusted in dependence on the type of motor vehicle wheel involved and is adapted to be lowered into an operating position. The electric motor of that apparatus is operable to cause the tire fitting tool consisting of the two tire fitting rollers and a tire guide roller on the single-armed fitting head to be rotated about an axis, through a 360° movement, whereby it is possible to fit a tire on to a disc wheel without having to approach the wheel too closely.

Such an installation may have an electronic torque sensing arrangement to permit monitoring of the tire fitting process and to give a display for example at a pointer instrument. The installation may also have a lamp-type display to indicate if a preset maximum permissible torque is exceeded, so that it is possible to carry out a further check after a fitting operation of that kind, on the fitted tire. However that apparatus does not necessarily ensure that a tire is properly fitted on to a wheel, without involving operator intervention during or after a tire fitting procedure.

SUMMARY OF THE INVENTION

An object of the present invention is to provide an apparatus for fitting a tire on to a wheel which is capable of preventing the tire from being overloaded during the tire fitting operation.

Another object of the present invention is to provide an apparatus for fitting a motor vehicle tire on to the rim of a disc wheel, which can prevent excessive forces from being applied to the wheel and to the tire, and damage to the tire.

Still another object of the present invention is to provide a tire fitting apparatus which affords an automatic tire fitting operation and which has a high level of sensitivity to an incipient risk of damage to a tire.

In accordance with the present invention, the foregoing and other objects are achieved by an apparatus for fitting a tire on to a disc wheel comprising a tire fitting tool means mounted rotatably about an axis and at a spacing from the axis, with an electric motor as a drive for producing a rotary drive movement of the tire fitting tool means about the axis. The electric motor is powered from a power supply means connected to a torque limiting means adapted to cause a braking current to be applied to the drive motor to stop the rotary drive when a predetermined torque (torque threshold), which is transmitted by the drive motor to the tire fitting tool means, is exceeded.

As will be seen in greater detail hereinafter, the present invention provides that the desired torque limiting effect and therewith the careful treatment to be imparted to the tire during a tire fitting operation in order to ensure that the tire does not suffer damage is achieved by supplying power to the drive motor under a torque-monitoring condition. That ensures that the rim portions of the disc wheel are not subjected to excessively high forces while the tire is being fitted on to same, and that therefore, also substantially eliminates the risk of damage to the tire, in particular, the risk of the wheel cutting into the tire bead which is fitted over the edge portion of the rim of the wheel. More particularly, the apparatus according to the invention reduces a run-on effect on the part of the tire fitting tool means when an excessively high level of torque is detected, as the configuration according to the invention provides that the rotary drive to the tire fitting tool means can be quickly stopped.

Furthermore the predetermined torque which is transmitted from the drive motor to the tire fitting tool means can be set in dependence on the diameter of the tire. For that purpose suitable torque programs can be stored in a suitable storage arrangement. The torque programs can be set up in dependence on wheel rim diameter, tire bead or tire type. The predetermined torque represents a torque threshold, so as to prevent the transmission of an excessive level of torque during a tire fitting operation.

The apparatus according to the invention can therefore ensure that, while guaranteeing that a tire is handled in a careful fashion during a fitting operation, the tire fitting operation can also be carried out at the highest possible fitting speed as the preset torque threshold ensures that overstressing of the tire in the fitting operation is eliminated.

In a preferred feature of the invention, the power supply means has a current control means and a torque regulating means, by way of which the supply current is fed to the drive motor. The current control means is connected to the current input of the torque regulating means or regulator and delivers the control parameter in the form of a control current, for the regulator. That arrangement can provide that the torque limiting means is coupled to the torque regulating means in such a way that, when the predetermined torque threshold is exceeded, the regulating parameter which is supplied as a reference torque to the torque limiting means is set to zero. That ensures that a braking effect is produced by virtue of the supplied control current which is thus supplied as a control parameter to the torque regulating means by way of the other input, so that the value of the regulating parameter, that is to say a reference torque value of zero, is attained. The higher the control current constituting the control parameter is, the more quickly the rotary drive can be stopped by virtue of the braking current which is supplied in that situation to the motor.

For that purpose, in an advantageous configuration, the torque limiting means may actuate a switch means in the current control means in such a way that, when the torque threshold is exceeded, the switch means is closed to pass an additional control current which causes the delivery of an increased braking current to the drive motor. That switch means may be the switch means which is closed when the drive motor is accelerated up to the reference speed during normal operation, for supplying the additional control current.

In another preferred feature of the invention, the torque limiting means may comprise a comparison means so that the torque limiting means can provide for control to zero of the regulating parameter which is supplied to the torque limiting means, and can also provide for actuation of the switch means in the current control means for delivery of an additional control current. The comparison means is arranged to receive an electrical signal which is proportional to the actual torque, and an electrical signal which is proportional to the predetermined torque threshold. The actual torque is the torque with which the drive motor acts on the tire fitting tool in the tire fitting operation.

If the above-mentioned actual torque exceeds the predetermined torque threshold, the comparison means supplies an output signal by which the regulating parameter which is supplied as the reference torque to the torque limiting means is set to zero, and in addition the output signal of the comparison means may serve to actuate the switch means in the current control means whereby the switch means is closed and the additional control current is supplied to cause the motor to slow down. Setting the regulating parameter to zero and increasing the control current which is supplied to the regulating means as a control parameter causes an increased braking current and thus rapid deceleration of the motor and consequently a reduction in the torque acting on the tire fitting tool.

The protection which can be afforded for the tire by the apparatus according to the present invention during the tire fitting operation by virtue of torque limitation may advantageously be achieved by monitoring the speed of rotation of the drive motor, whereby the actual torque value is represented by an electrical signal which is proportional to the actual speed of rotation of the drive motor. The torque monitoring means provided for that purpose, for example in the form of a tachogenerator, delivers an electrical signal which corresponds to the actual speed of rotation of the drive motor and which thus provides information about the prevailing actual torque. That signal is suitably linked to the torque regulating means which for that purpose is in the form of a rotary speed regulating means, more specifically in such a way that a signal which is proportional to a reference speed of rotation, to act as a regulating parameter, is compared in the regulating means to the signal supplied as the actual value in respect of the speed of rotation of the drive motor.

Furthermore, the signal corresponding to the actual speed of rotation of the drive motor is passed to the comparison means in the torque limiting means which thus acts as a rotary speed monitoring means. The second signal which is supplied to the comparison means and which represents the torque threshold corresponds to a threshold value in respect of the speed of rotation of the drive motor.

Further objects, features and advantages of the present invention will be apparent from the following description of a preferred embodiment.

DESCRIPTION OF THE PREFERRED EMBODIMENT

Figure 1:
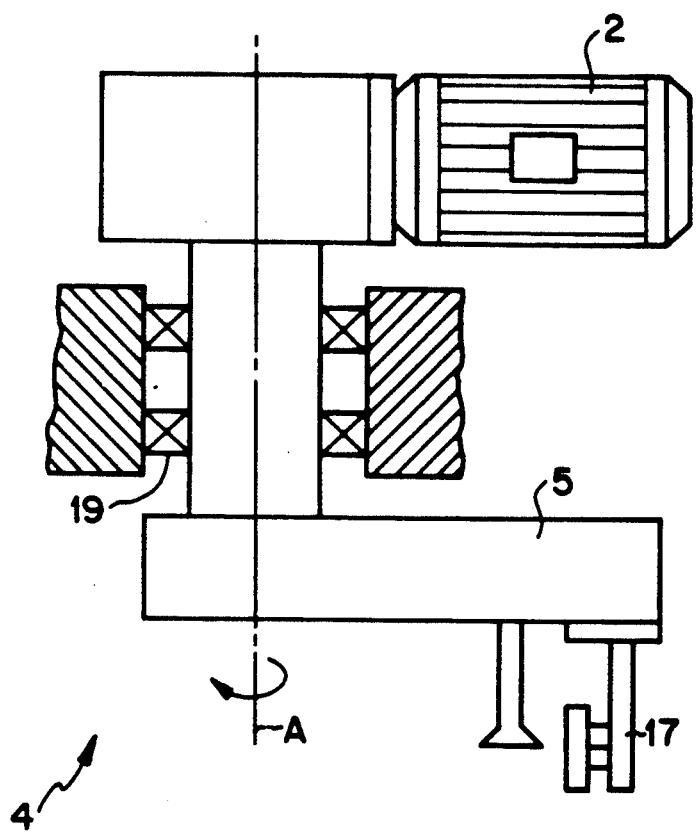
FIG. 1 is a diagrammatic view of an embodiment of a tire fitting head which can be used in the apparatus according to the invention.

Referring firstly to FIG. 1, shown diagrammatically therein is a design configuration of a tire fitting head 4 which can be used in the apparatus according to the invention for fitting motor vehicle tires on to rims of disc wheels. The tire fitting head 4 essentially comprises a tire fitting tool 17 which is supported in a mounting arrangement 19 rotatably about an at least substantially vertical axis A. The tire fitting tool 17 is disposed at a spacing from the axis A. That spacing can be adjusted in dependence on the tire and/or rim diameter of the disc wheel on to which the tire is to be fitted. For that purpose the tire fitting tool 17 is mounted on a fitting arm 5 which extends at least perpendicularly to the axis A. The rotary drive for the tire fitting tool 17, for performing the tire fitting operation, is supplied by a drive motor, more especially as shown in the form of an electric motor 2. The motor here is preferably a servomotor, for example a three-phase servo motor, although it is also possible to use a dc servomotor. The tire fitting head 4 may be used in the appropriate fashion in a fitting station of an automatic tire fitting installation such as that referred to above and described in Hofmann report 66 from Gebr. Hofmann GmbH & Co KG.

Figure 2:
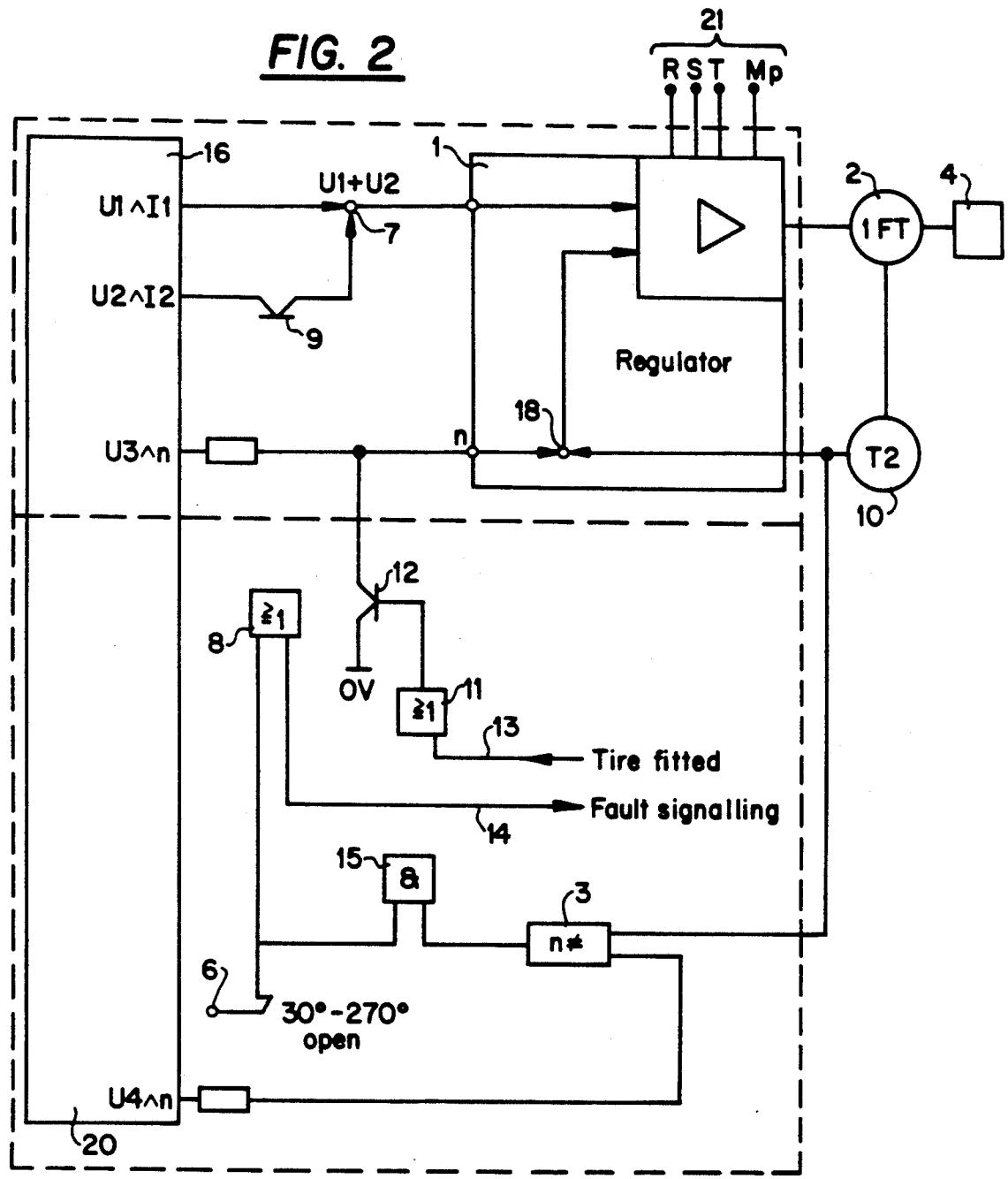
FIG. 2 shows a block circuit diagram of configurations of the torque limiting means and current supply means used in the apparatus according to the present invention.

Referring now to FIG. 2, connected to the drive motor 2 is a current supply means and a torque limiting means, the component parts of which are bordered by broken lines.

In the configuration shown in FIG. 2, the current supply means for the drive motor 2, as its essential components, includes a regulator which is connected to a three-phase supply source 21 and which acts as a torque regulating means 1, and a control parameter generator 16 for supplying programmed output voltages U1 and U2 for torque regulation and an output voltage U3 which is passed as a regulating parameter to the regulator 1. The current supply means also includes a switch means 9 which is preferably in the form of a transistor and a summing circuit 7 for summing control currents I1 and I2 which are supplied at the outputs U1 and U2 of the signal generator 16 and which are supplied as a control parameter to the input I of the torque regulating means 1 when the drive motor is being accelerated and decelerated, as will be described in greater detail hereinafter.

The summing circuit 7, the switch means 9 and the signal generator 16 (control parameter generator) form a current control means.

The torque regulating means 1 also includes, in known fashion, a comparison means 18 which receives the regulating parameter and an actual value, as will be described in greater detail hereinafter.

Connected to the output of the torque regulating means 1 is the drive motor 2 which, as already described above with reference to FIG. 1, produces the required torque for the tire fitting head 4 in the operation of fitting a motor vehicle tire on to the rim portions of a disc wheel.

The above-mentioned torque limiting means includes a comparison means 3 of which an input receives an output signal from a tachogenerator 10 forming a rotary speed measuring means which is suitably connected to the drive motor 2, as indicated in FIG. 2. The other input of the comparison means 3 receives a signal supplied by an output with a voltage U4 of a programmed control parameter generator 20. That signal corresponds to a rotary speed threshold, the significance of which will be described in detail hereinafter.

The output of the comparison means 3 is connected by way of a NAND-circuit 15 to an input of an OR-circuit 11. The output of the OR-circuit 11 is connected to the base of a transistor 12 which acts as a switch means operable to deal with the control parameter which is supplied by the output U3 of the signal generator 16, as will also be described hereinafter.

A second input of the NAND-circuit 15 is connected to a switch 6 which is open for example over a range of rotary movement of the tire fitting head of between about for example 30° and 270°. The output of the NAND-circuit 15 and a contact of the switch 6 are connected to respective ones of the two inputs of a further OR-gate 8. The output of the OR-gate 8 is connected to the base of the transistor 9 forming the switch means in the current control means.

Having described the structure of the circuit arrangement shown in FIG. 2, the mode of operation thereof in conjunction with the drive motor 2 will now be set forth:

After the tire fitting head 4 shown in FIG. 1 has been fitted on to the tire to be fitted to a wheel, the voltages to be delivered at the outputs U1, U2, U3 and U4 are prepared by the control parameter generators 16 and 20. The switch 6 is also actuated so that the switch means 9 shown in the form of a transistor is switched on. As a result, both the output U1 and the output U2 supply control currents I1 and I2 which are summed in the summing circuit 7 to give an increased control current. That current is passed by way of the input I to the torque regulating means 1 for acceleration of the drive motor 2. The drive motor 2 is accelerated up to a reference rotary speed which, in the form of the signal supplied at the output U3 of the generator 6, is passed as a regulating parameter to the input indicated at n of the torque regulating means 1.

As indicated above, connected to the drive motor 2 is the rotary speed measuring means 10 which at its output produces an electrical signal which is proportional to the actual speed of rotation of the drive motor. That signal is passed as an actual value to the comparison means 18 in the torque or rotary speed regulating means 1. In that way the required continuous regulating function is carried into effect and the motor rotates at the desired reference speed.

After the tire fitting head 4 has been pivoted within a given angular range between for example about 20 and 30° at the beginning of the tire fitting operation, the switch 6 is opened. As a result, the switch means 9 is switched off so that the drive motor 2 is then only powered by the supply source 21 in dependence on the reduced control current I1 by way of the regulating means 1.

As a result of that, at the same time the torque limiting means which acts as a safety system is brought into operation. As FIG. 2 shows, the output signal of the rotary speed measuring means 10, which is thus proportional to the speed of rotation, is supplied to the one input of the comparison means 3. The other input of the comparison means 3 receives the signal from the output U4 of the signal generator 20. That signal is proportional to a rotary speed threshold which represents a torque threshold.

If, during the tire fitting operation, an excessive torque occurs as between the tire fitting tool indicated at 17 in FIG. 1 and the output shaft of the drive motor 2, the speed of rotation of the drive motor 2 will drop. The output signal of the rotary speed measuring means 10 will alter accordingly and, by virtue of the signal difference, the comparison means 3 will then supply an output signal which goes by way of the NAND-circuit 15 and the OR-circuit 11 to the base of the transistor 12 whereby the transistor 12 which is connected to ground becomes conducting and thus the switch means formed by the transistor 12 is switched on. That causes the regulating parameter which is passed to the input n of the regulating means 1 to go to zero.

At the same time the output signal of the comparison means 3 goes by way of the NAND-circuit 15 and the OR-gate 8 to the base of the transistor 9 which forms the switch means in the current supply means. That causes the switch means 9 to be switched on and an additional control current I2 is passed to the summing circuit 7, as was already the case when the drive motor 2 was being accelerated up to its operating speed. As the regulating parameter which is passed to the input n of the regulating means 1 is set to zero, as already indicated above, the increased control current represented by I1+I2 produces an increased braking current so that the drive motor 2 is strongly decelerated and can be brought to a halt, possibly without any noticeable run-on effect, in other words, with a high level of deceleration. That provides a torque limitation effect and thus ensures that the tire is treated carefully and in such a way as to be less likely to suffer damage in the tire fitting operation.

As the circuit arrangement shown in FIG. 2 also illustrates, it may include a line 14 to provide fault signalling in the form for example of an alarm or a light signal.

When the tire fitting operation is proceeding normally, after the tire fitting tool 17 has pivoted about the axis indicated at A in FIG. 1 through the rotary angle required for the tire fitting procedure to take place, reaching for example an angular position of 270°, the switch 6 is closed and a signal 'tire fitted' is also supplied by way of a control line 13 to the one input of the OR-circuit 11. When the switch 6 is closed, a signal is also outputted by way of the NAND-gate 15 to the other input of the OR-gate 11 so that the transistor forming the switch means 12, as already indicated above, is then switched into the conducting state. As a result, the regulating parameter supplied to the input n of the regulating means 1 will be brought to zero, as also just described above. Moreover, the switch means 9 in the current supply means is switched on by way of the OR-gate 8, and the additional current I2 is added to the control current I1 so that an increased braking current is supplied for deceleration of the drive motor 2. In that way, the drive motor 2 is brought to a halt when a normal tire fitting procedure is carried out.

In the illustrated embodiment, the actual value in respect of the regulating parameter for the regulating means 1 is an electrical signal which is proportional to the speed of rotation of the drive motor 2. That electrical signal is also used for operation of the safety system formed by the above-discussed torque limiting means. Preferably, the drive motor used is a low-inertia electric motor so that a rise in torque in the tire fitting operation is immediately expressed as a drop in speed of rotation which is detected by the rotary speed measuring means 10. Preferably, servomotors are used for that purpose, which can be used in the form of three-phase servomotors, for example synchronous or asynchronous motors, or dc servomotors.

When the apparatus uses dc servomotors, it is also possible to sense another parameter as the critical value in regard to a rise in torque above the predetermined threshold at the drive motor, that other parameter being, for example, an armature current which is increased when the drive motor is put under load, being in the form of a voltage drop in the armature circuit, the above-described operating procedure of the torque limiting means then coming into play.

It will be appreciated from the foregoing description that the invention provides a protective arrangement which can effectively reduce the risk of overloading the tire or excessively stressing same when fitting the tire on to a wheel, which could otherwise cause damage to the tire, more specifically in the bead region where it is pulled over the edge portion of the wheel rim.

It will also be appreciated that the above-described construction in accordance with the principles of the present invention has been set forth solely by way of example and illustration of the invention and that various modifications and alterations may be made therein without thereby departing from the spirit and scope of the present invention.

What is claimed is:

1. Apparatus for fitting a tire on a wheel comprising:
    a tool member rotatably mounted about an axis and being spaced therefrom;
    A drive motor for rotating the tool member about the axis;
    means for supplying current to the drive motor;
    means for controlling current so as to provide a first control current to the drive motor;
    means for regulating torque of the drive motor, a regulating parameter being supplied as a reference torque to the regulating means; and
    means for limiting torque of the drive motor being operatively connected to (1) the torque regulating means such that when a torque threshold is exceeded the regulating parameter is set to zero, and (2) the current controlling means such that when the torque threshold is exceeded an additional control current is passed to the first control current to cause a braking current to be supplied to the drive motor so as to stop rotation thereof.

2. Apparatus as claimed in claim 1, wherein said current controlling means further includes a switch means, said switch means being connected to said torque limiting means such that when the torque threshold is exceeded, said switch means is closed so as to pass the additional control current.

3. Apparatus as set forth in claim 2, wherein the torque limiting means includes a comparison means adapted to receive an electrical signal proportional to the actual torque and an electrical signal proportional to the torque threshold, the output signal of the comparison means serving for closing said switch means.

4. Apparatus as set forth in claim 2, wherein when running up the drive motor, the additional control current is fed to the regulating means by way of said switch means which is in a closed condition, a signal proportional to the reference speed of rotation of the drive motor is applied to the regulating means as said regulating parameter, and at the reference speed of rotation of the drive motor the switch means is opened, and in a slowing mode the signal applied to the regulating means as the regulating parameter is set to zero and closure of the switch means in the current controlling means causes the additional control current to be applied to the regulating means.

5. Apparatus as set forth in claim 1 wherein the torque limiting means includes a comparison means adapted to receive an electrical signal proportional to the actual torque and an electrical signal proportional to the torque threshold, the output signal of the comparison means serving for zero setting of the regulating parameter supplied as the reference torque to the torque regulating means.

6. Apparatus as set forth in claim 1 wherein the actual torque is represented by an electrical signal which is proportional to the actual speed of rotation of the drive motor.

7. Apparatus as set forth in claim 1 wherein said torque threshold is represented by an electrical signal which is proportional to the reference speed of the drive motor and which forms the regulating parameter.

8. Apparatus as set forth in claim 1 and further including a rotary speed measuring means connected to the drive motor and operable to produce an output signal which is proportional to the motor speed and which is applied as an actual value to the regulating means.

9. Apparatus as set forth in claim 8 and further including a comparison means operable to compare an electrical signal which is proportional to the actual speed of rotation of the drive motor, and an electrical signal representing a threshold speed of rotation.

* * * * *